US012380833B1

(12) United States Patent
Lu et al.

(10) Patent No.: US 12,380,833 B1
(45) Date of Patent: Aug. 5, 2025

(54) TIMING CONTROLLER AND IMAGE ADJUSTMENT METHOD

(71) Applicant: NOVATEK Microelectronics Corp., Hsin-Chu (TW)

(72) Inventors: Hsin-Han Lu, Taoyuan (TW); Yen-Tao Liao, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/770,624

(22) Filed: Jul. 11, 2024

(30) Foreign Application Priority Data

Feb. 5, 2024 (TW) ................................ 113104393

(51) Int. Cl.

| | |
|---|---|
| ***G09G 5/00*** | (2006.01) |
| ***G09G 3/20*** | (2006.01) |
| ***G09G 3/36*** | (2006.01) |
| ***G09G 5/06*** | (2006.01) |

(52) U.S. Cl.

CPC ......... *G09G 3/2096* (2013.01); *G09G 3/3607* (2013.01); *G09G 5/06* (2013.01); *G09G 2320/0242* (2013.01); *G09G 2320/066* (2013.01); *G09G 2320/0666* (2013.01); *G09G 2320/0693* (2013.01)

(58) Field of Classification Search

CPC .......................................... G09G 3/2003–2096

See application file for complete search history.

(56) References Cited

U.S. PATENT DOCUMENTS

2003/0227448 A1* 12/2003 Janssen ................ G09G 3/2011 345/204
2009/0129698 A1* 5/2009 Wang ........................ G06T 5/73 345/87
2017/0110044 A1 4/2017 Ahn
2017/0116934 A1 4/2017 Tien
2019/0156728 A1 5/2019 Yu

FOREIGN PATENT DOCUMENTS

CN 106847157 A 6/2017
CN 116092423 A 5/2023
TW 201801064 A 1/2018

* cited by examiner

*Primary Examiner* — Roy P Rabindranath
(74) *Attorney, Agent, or Firm* — Winston Hsu

(57) ABSTRACT

A timing controller for executing an image adjustment method is provided. The timing controller includes an image adjustment circuit including a feature extraction module, configured to obtain a first feature value of a pixel according to a sub-pixel value of the pixel; a look-up table module, coupled to the feature extraction module, configured to obtain a first sub-pixel value of the pixel according to a first lookup table and obtain a second sub-pixel value of the pixel according to a second lookup table; and a color adjustment module, coupled to the feature extraction module and the look-up table module, configured to compare the first feature value with a first threshold, and correspondingly adjust the sub-pixel value of the pixel according to the first sub-pixel value and the second sub-pixel value.

18 Claims, 10 Drawing Sheets

TIMING CONTROLLER AND IMAGE ADJUSTMENT METHOD

BACKGROUND OF THE INVENTION

1. Field of the Invention

The present invention relates to a timing controller and an image adjustment method thereof, and more particularly, to a timing controller and an image adjustment method thereof for reducing image distortion.

2. Description of the Prior Art

Liquid-Crystal Display (LCD) is one of the most widely used types of display devices, commonly found in applications such as TV, mobile devices, computer monitors. After years of development, the manufacturing technology of LCD has become more and more mature, and with the advantages of low manufacturing cost and long service life, LCD has a significant position in the display market nowadays. However, with the advancement of various peripheral electronic devices, the image size, picture quality, and display speed required for LCD outputs are still being upgraded. Currently, there is still much room for improvement in display technology and image quality of LCD. In order to meet users' demand for perfect picture quality, improving image quality is still an urgent issue for the industry.

SUMMARY OF THE INVENTION

Therefore, the present invention aims to provide a timing controller and an image adjustment method for improving the image quality of LCD.

An embodiment of the present invention discloses an image adjustment method. The image adjustment method includes obtaining a first feature value of a pixel according to a sub-pixel value of the pixel; obtaining a first sub-pixel value of the pixel according to a first lookup table; obtaining a second sub-pixel value of the pixel according to a second lookup table; and comparing the first feature value with a first threshold, and correspondingly adjusting the sub-pixel value of the pixel according to the first sub-pixel value and the second sub-pixel value.

An embodiment of the present invention further discloses a timing controller. The timing controller includes an image adjustment circuit, and the image adjustment circuit includes a feature extraction module, a look-up table module and a color adjustment module. The feature extraction module is configured to obtain a first feature value of a pixel according to a sub-pixel value of the pixel. The look-up table module, coupled to the feature extraction module, is configured to obtain a first sub-pixel value of the pixel according to a first lookup table and obtain a second sub-pixel value of the pixel according to a second lookup table. The color adjustment module, coupled to the feature extraction module and the look-up table module, is configured to compare the first feature value with a first threshold, and correspondingly adjust the sub-pixel value of the pixel according to the first sub-pixel value and the second sub-pixel value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
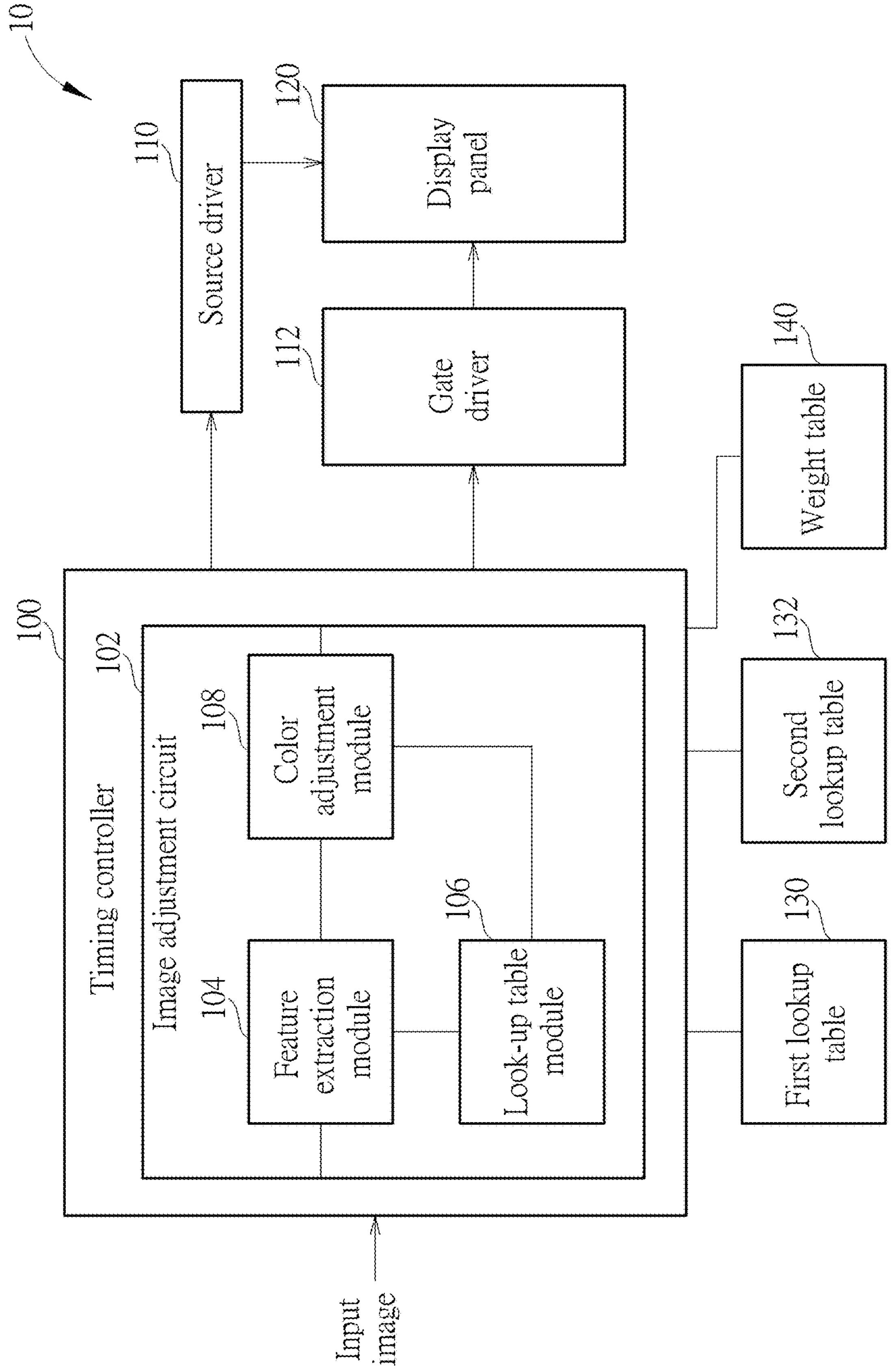
FIG. 1 is a schematic diagram of a display device according to an embodiment of the present invention.

Please refer to FIG. 1, which is a schematic diagram of a display device 10 according to an embodiment of the present invention. The display device 10 may be, but not limited to, a Liquid-Crystal Display (LCD), and may comprise a timing controller 100, at least one source driver 110, at least one gate driver 112 and a display panel 120. The timing controller 100 may receive at least one input image and output related display control signals to the source driver 110 and the gate driver 112 after processing, and then perform timing display control, such as timing control and image adjustment, on the display panel 120 through the source driver 110 and the gate driver 112. As shown in FIG. 1, the timing controller 100 may comprise an image adjustment circuit 102 for performing image adjustment in the display device 10, especially for preventing from image distortion, improving image contrast and decreasing saturation loss. The image adjustment circuit 102 may comprise a feature extraction module 104, a look-up table module 106 and a color adjustment module 108. The feature extraction module 104 is coupled to the look-up table module 106 and the color adjustment module 108, and the look-up table module 106 is coupled to the color adjustment module 108. The feature extraction module 104, the look-up table module 106 and the color adjustment module 108 may be implemented as sub-circuits of the image adjustment circuit 102, and are not limited thereto. It should be noted, only the necessary components of the display device required to implement the embodiments of the present invention is shown in FIG. 1, and those skilled in the art may make various modifications and adjustments accordingly, and is not limited thereto.

In general, the image adjustment circuit 102 may perform color calibration on each pixel in the input image according to an ACC (accurate color capture tuning) lookup table so as to obtain a calibrated sub-pixel value including red, green and blue sub-pixel values. Part of the ACC lookup table is shown in Table 1 below:

TABLE 1

| | R | G | B |
|---|---|---|---|
| 000 | 0 | 0 | 0 |
| 001 | 32 | 25 | 30 |
| 002 | 44 | 37 | 40 |
| 003 | 52 | 46 | 47 |

As shown in Table 1, an adjusted sub-pixel value may be obtained through the ACC lookup table according to the color index of the pixel. However, under certain technologies and circumstances, the color adjusted through the ACC lookup table may not be appropriately displayed by the display device 10. For example, when the display device 10 adopts a tri-gate panel architecture, color deviation may occur because some areas of the line overdrive (line OD) are insufficiently charged, resulting in a contour phenomenon on the screen. The contour phenomenon is especially likely to occur when one or two sub-pixels of the same pixel have a value of zero. To avoid the contour phenomenon, the conventional technologies generally replaces the normal ACC lookup table as shown in Table 1 with a clip ACC lookup table. Part of the clip ACC lookup table may be as shown in Table 2 below:

TABLE 2

| | R | G | B |
|---|---|---|---|
| 000 | 12 | 12 | 12 |
| 001 | 32 | 25 | 30 |
| 002 | 44 | 37 | 40 |
| 003 | 52 | 46 | 47 |

As shown in Table 2, the sub-pixel value corresponding to color index 000 was (0, 0, 0) in Table 1 and has been increased to (12, 12, 12) so as to pre-adjust the color of the pixels that may have the problems of color deviation. The contour phenomenon caused by insufficient charging may be solved thereby; however, the method of using the clip ACC lookup table leads to the loss of contrast ratio and color saturation.

Figure 2:
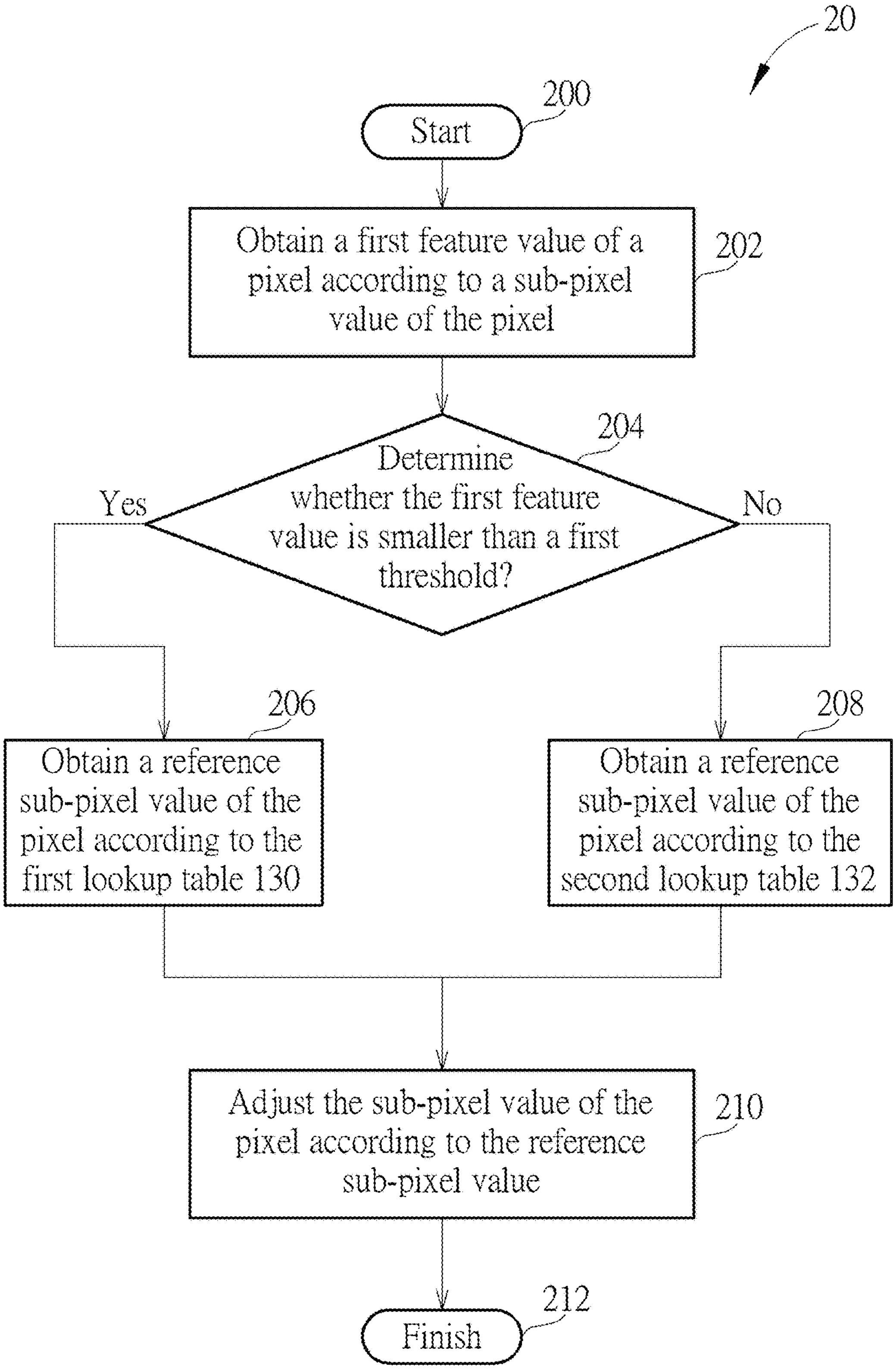
FIG. 2 is a schematic diagram of an image adjustment process according to an embodiment of the present invention.

To address the above problem, the embodiments of the present invention perform color calibration by using both the general ACC lookup table and the clip ACC lookup table according to different feature values of the pixel, so as to ameliorate the contour phenomenon and maintain a satisfactory contrast ratio and color saturation of the image at the same time. As shown in FIG. 1, the display device 10 may further comprise a first lookup table 130 and a second lookup table 132. The first lookup table 130 may be a general ACC lookup table as shown in Table 1, and the second lookup table 132 may be a clip ACC lookup table that decreases the color level as shown in Table 2. The method for the timing controller 100 to perform image adjustment according to the first lookup table 130 and the second lookup table 132 may be summarized into a process 20, as shown in FIG. 2. The process 20 may comprise the following steps:

Step 200: Start.

Step 202: Obtain a first feature value of a pixel according to a sub-pixel value of the pixel.

Step 204: Determine whether the first feature value is smaller than a first threshold? If yes, proceed to Step 206; otherwise, proceed to Step 208.

Step 206: Obtain a reference sub-pixel value of the pixel according to the first lookup table 130.

Step 208: Obtain a reference sub-pixel value of the pixel according to the second lookup table 132.

Step 210: Adjust the sub-pixel value of the pixel according to the reference sub-pixel value.

Step 212: Finish.

According to the process 20, the image adjustment circuit 102 performs color adjustment for each pixel of the image. Specifically, the feature extraction module 104 obtains a first feature value of a pixel according to a sub-pixel value of the pixel (Step 202). Next, the look-up table module 106 determines whether the first feature value is smaller than a first threshold (Step 204). When the first feature value is smaller than the first threshold, the look-up table module 106 obtains a reference sub-pixel value of the pixel according to the first lookup table 130 (Step 206); when the first feature value is greater than or equal to the first threshold, the look-up table module 106 obtains a reference sub-pixel value of the pixel according to the second lookup table 132 (Step 208). Finally, the color adjustment module 108 adjusts the sub-pixel value of the pixel according to the reference sub-pixel value obtained in Step 206 or in Step 208 (Step 210). Accordingly, by comparing the first feature value of each pixel with the first threshold, the image adjustment circuit 102 is able to adjust the colors of the image according to the reference sub-pixel values obtained from the first lookup table 130 or the second lookup table 132, thereby avoiding color deviation while retaining the best contrast ratio and color saturation.

In an embodiment, the first feature value may be a saturation value of the pixel. Since the naked eye has insufficient ability to perceive colors with low saturation, the embodiment of the present invention sets the first threshold accordingly. When the first feature value is smaller than the first threshold (i.e., when the saturation value of the pixel is so low that the color of the pixel cannot be effectively recognized by the naked eye), the sub-pixel value may be adjusted according to the general ACC lookup table (such as the first lookup table 130). When the first feature value is greater than or equal to the first threshold (i.e., when the saturation value of the pixel is so high that the color of the pixel can be effectively recognized by the naked eye), the sub-pixel value may be adjusted according to the clip ACC lookup table (such as the second lookup table 132). In another embodiment, the first feature value may be a luminance value of the pixel. Since the naked eye has insufficient ability to perceive colors with low luminance, the embodiment of the present invention sets the first threshold accordingly. When the first feature value is smaller than the first threshold (i.e., when the luminance value of the pixel is so low that the color of the pixel cannot be effectively recognized by the naked eye), the sub-pixel value may be adjusted according to the general ACC lookup table (such as the first lookup table 130). When the first feature value is greater than or equal to the first threshold (i.e., when the luminance value of the pixel is so high that the color of the pixel can be effectively recognized by the naked eye), the sub-pixel value may be adjusted according to the clip ACC lookup table (such as the second lookup table 132). Accordingly, the embodiments of the present invention are capable of retaining colors with low sub-pixel values without being recognized by the human eye.

Figure 3:
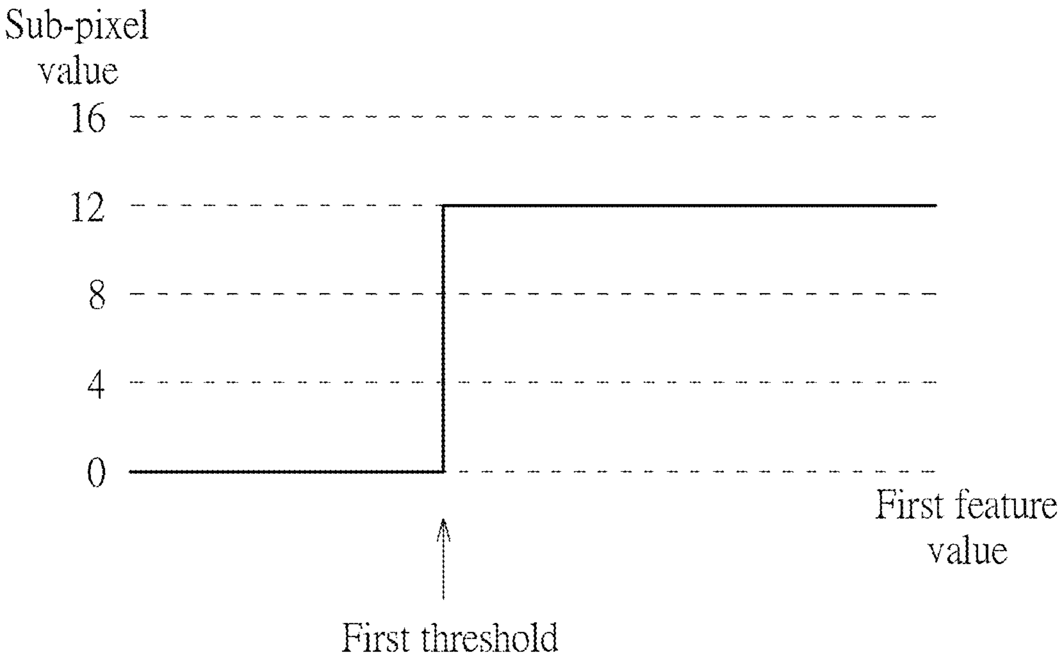
FIG. 3 is a schematic diagram of determining a sub-pixel value according to an exemplary embodiment of the present invention.

Please refer to FIG. 3, which is a schematic example of determining a sub-pixel value according to the process 20. Taking the sub-pixel value corresponding to the color index 000 in Table 1 and Table 2 as an example, the look-up table module 106 obtains the reference sub-pixel value as (0, 0, 0) based on the first lookup table 130 (Table 1) and obtains the reference sub-pixel value as (12, 12, 12) based on the second lookup table 132 (Table 2). As shown in FIG. 3, according to the process 20, when the first feature value is smaller than the first threshold, the color adjustment module 108 adjusts the sub-pixel value of the pixel to the reference sub-pixel value (0, 0, 0); when the first feature value is greater than or equal to the first threshold, the color adjustment module 108 adjusts the sub-pixel value of the pixel to the reference sub-pixel value (12, 12, 12).

Figure 4:
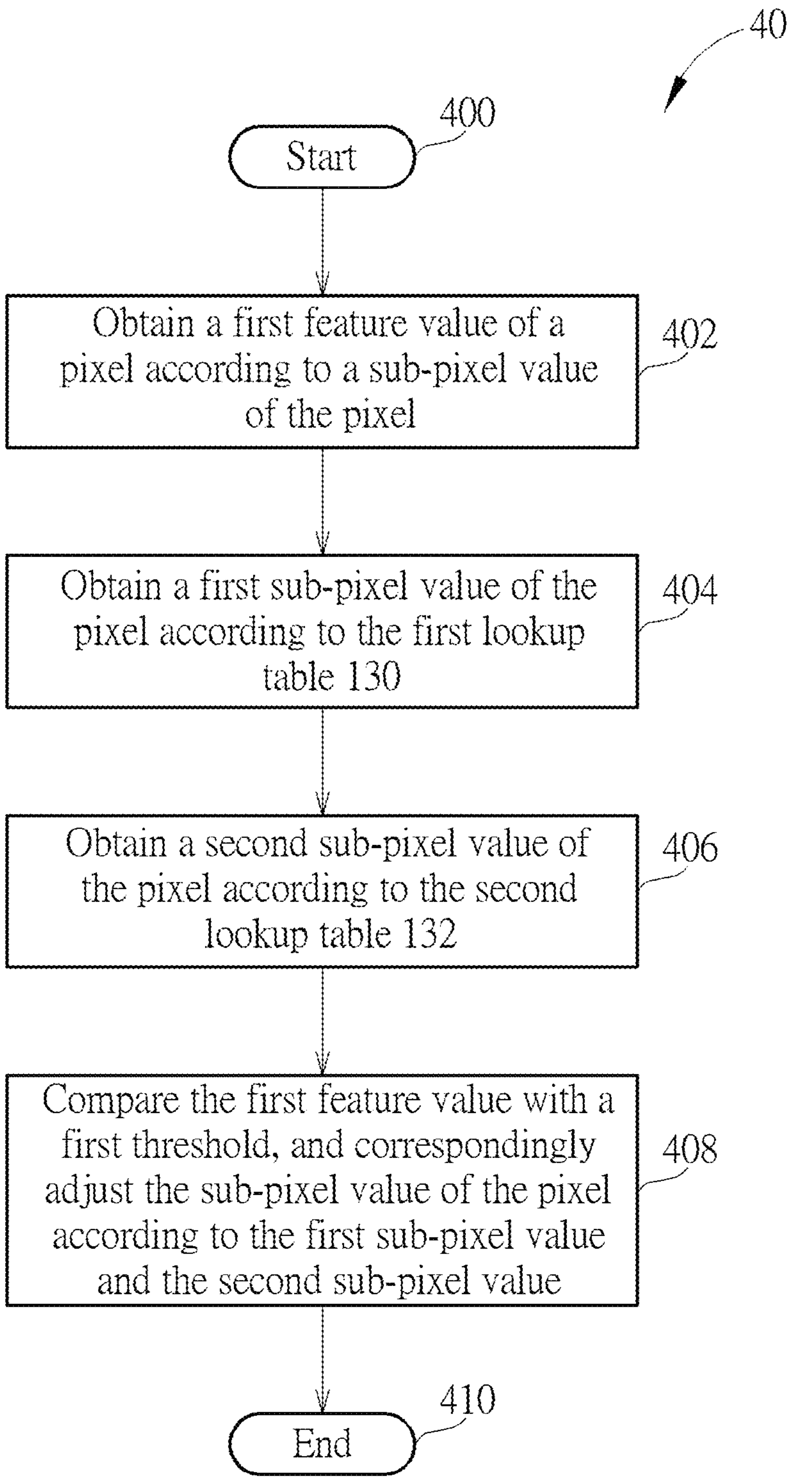
FIG. 4 is a schematic diagram of an image adjustment process according to an embodiment of the present invention.

It should be noted, as shown in FIG. 3, the sub-pixel value adjusted according to the process 20 may result in color discontinuity in the final display screen, and thus not be as good as expected in terms of color performance. Therefore, the embodiments of the present invention further considers a weight value, and adjusts the sub-pixel value of the pixel according to the reference sub-pixel values obtained from both the first lookup table 130 and the second lookup table 132, so as to further improve this phenomenon. Please refer to FIG. 1. The display device 10 may further comprise a weight table 140 for obtaining the weight value according to the first feature value of the pixel. The method for the timing controller 100 to perform image adjustment according to the weight table 140, the first lookup table 130 and the second lookup table 132 may be summarized into a process 40, as shown in FIG. 4. The process 40 may comprise the following steps:

Step 400: Start.

Step 402: Obtain a first feature value of a pixel according to a sub-pixel value of the pixel.

Step 404: Obtain a first sub-pixel value of the pixel according to the first lookup table 130.

Step 406: Obtain a second sub-pixel value of the pixel according to the second lookup table 132.

Step 408: Compare the first feature value with a first threshold, and correspondingly adjust the sub-pixel value of the pixel according to the first sub-pixel value and the second sub-pixel value.

Step 410: End.

According to the process 40, the image adjustment circuit 102 performs color adjustment for each pixel of the image. Specifically, the feature extraction module 104 first obtains a first feature value of a pixel according to a sub-pixel value of the pixel (Step 402). As mentioned above, since the naked eye is not capable of distinguishing colors with low saturation or low luminance, the embodiment of the present invention adopts the saturation value or luminance value of the pixel as the first feature value of the pixel to further adjust the color of the pixel. Then, the look-up table module 106 obtains a first sub-pixel value of the pixel and a second sub-pixel value of the pixel according to the first lookup table 130 and the second lookup table 132 respectively (Step 404 and Step 406). Finally, the color adjustment module 108 compares the first feature value with a first threshold, and correspondingly adjusts the sub-pixel value of the pixel according to the first sub-pixel value and the second sub-pixel value obtained in Step 404 and Step 406 (Step 408).

Figure 5:
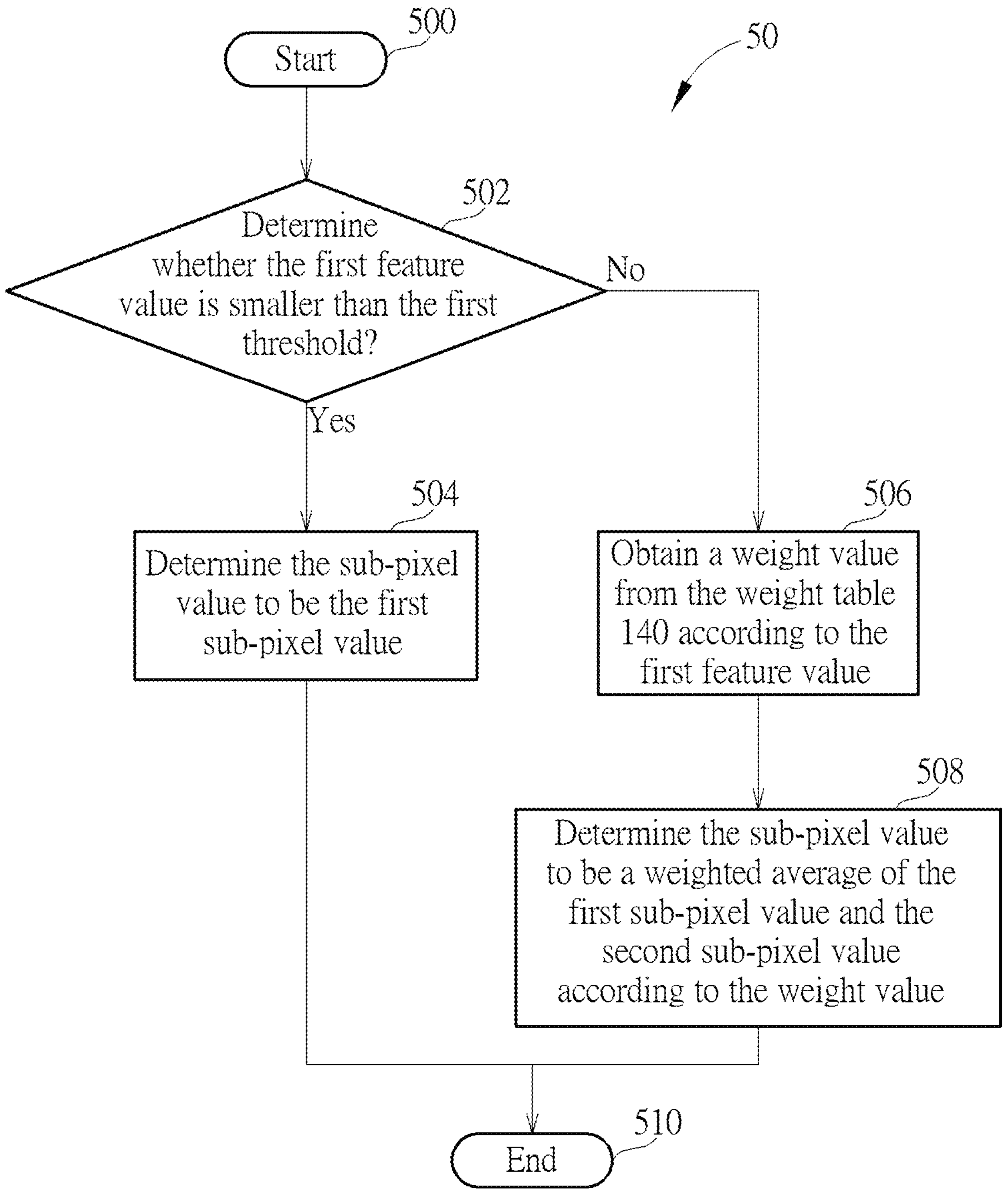
FIG. 5 is a schematic diagram of a process for determining a sub-pixel value according to an embodiment of the present invention.

Please refer to FIG. 5, which is a schematic diagram of a process 50 where the color adjustment module 108 adjusts the sub-pixel value in Step 408 according to the embodiment of the present invention. The process 50 may comprise the following steps:

Step 500: Start.

Step 502: Determine whether the first feature value is smaller than the first threshold? If yes, proceed to Step 504; otherwise, proceed to Step 506.

Step 504: Determine the sub-pixel value to be the first sub-pixel value.

Step 506: Obtain a weight value from the weight table 140 according to the first feature value.

Step 508: Determine the sub-pixel value to be a weighted average of the first sub-pixel value and the second sub-pixel value according to the weight value.

Step 510: End.

According to the process 50, the color adjustment module 108 compares the first feature value with the first threshold, and correspondingly adjusts the sub-pixel value of the pixel according to both the first sub-pixel value and the second sub-pixel value. In the embodiment, when the first feature value is smaller than the first threshold (i.e., when the saturation value or the luminance value of the pixel is so low that the color of the pixel cannot be effectively recognized by the naked eye), the sub-pixel value of the pixel may be determined to be the first sub-pixel value obtained from the general ACC lookup table (the first lookup table 130) (Step 504). When the first feature value is greater than or equal to the first threshold, the color adjustment module 108 may obtain the weight value from the weight table 140 according to the first feature value (Step 506) and determine the sub-pixel value to be a weighted average of the first sub-pixel value and the second sub-pixel value according to the weight value (Step 508). It should be noted, in the embodiment, the weight value determined by the weight table 140 is required to let the proportion of the second sub-pixel value be positively related to the first feature value after calculating the weighted average of the first sub-pixel value and the second sub-pixel value. In other words, as the first feature value gets closer to the first threshold, the determined sub-pixel value needs to be closer to the first sub-pixel value obtained from the first lookup table 130; as the first feature value gets larger, the determined sub-pixel value needs to be closer to the second sub-pixel value obtained from the second lookup table 132. That is to say, when the first feature value of the pixel is greater than or equal to the first threshold, the adjusted sub-pixel value will be in the range between the first sub-pixel value and the second sub-pixel value.

Figure 6:
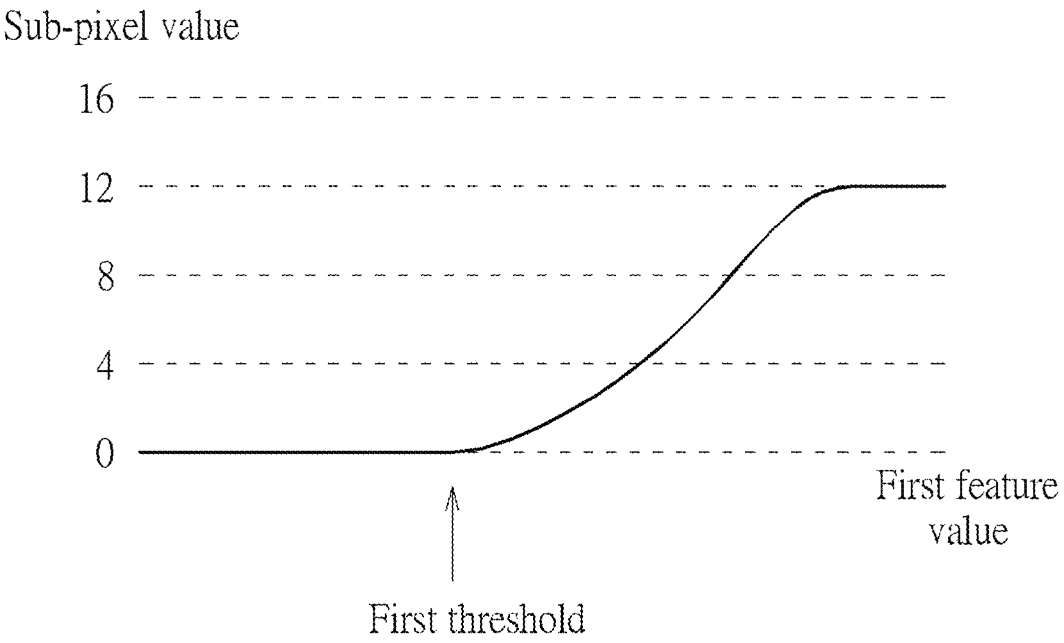
FIG. 6 is a schematic diagram of determining a sub-pixel value according to an exemplary embodiment of the present invention.

Please refer to FIG. 6, which is a schematic example of determining a sub-pixel value according to the process 50. Taking the sub-pixel value corresponding to the color index 000 in Table 1 and Table 2 as an example, the look-up table module 106 obtains the first sub-pixel value as (0, 0, 0) based on the first lookup table 130 (Table 1) and obtains the second sub-pixel value as (12, 12, 12) based on the second lookup table 132 (Table 2). As shown in FIG. 6, according to the process 50, when the first feature value is smaller than the first threshold, the color adjustment module 108 adjusts the sub-pixel value of the pixel to the first sub-pixel value (0, 0, 0). When the first feature value is greater than or equal to the first threshold, the color adjustment module 108 adjusts the sub-pixel value of the pixel uses the weighted average of the first sub-pixel value and the second sub-pixel value as the sub-pixel value according to the weight value. In other words, when the first feature value of the pixel is greater than or equal to the first threshold, the adjusted sub-pixel value will be in the range [0, 12]. As shown in FIG. 6, when the first feature value of the pixel is greater than or equal to the first threshold, the relationship between the first feature value and the sub-pixel value determined based on the first feature value preferably presents a smooth increasing curve, and is not limited thereto. In comparison with the adjusted sub-pixel value determined by the dichotomy method in the process 20 (only to be 0 or 12), the sub-pixel value determined according to the process 50 may make a more detailed visualization of the overall image.

Figure 7:
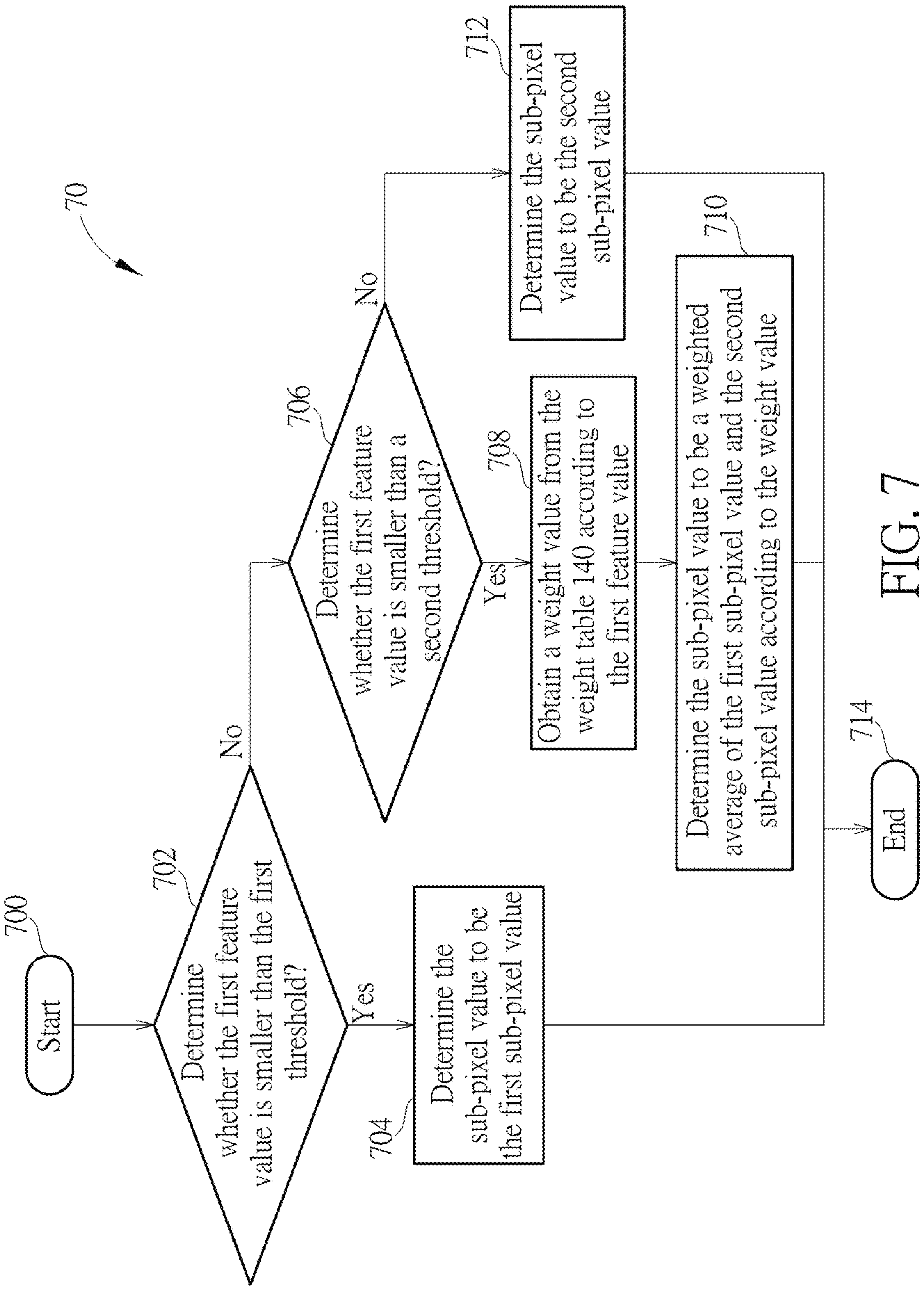
FIG. 7 is a schematic diagram of a process for determining a sub-pixel value according to an embodiment of the present invention.

Please refer to FIG. 7, which is a schematic diagram of another process 70 where the color adjustment module 108 adjusts the sub-pixel value in Step 408 according to the embodiment of the present invention. In the process 70, the color adjustment module 108 may further adjust the sub-pixel value of the pixel according to a second threshold. The process 70 may comprise the following steps:

Step 700: Start.

Step 702: Determine whether the first feature value is smaller than the first threshold? If yes, proceed to Step 704; otherwise, proceed to Step 706.

Step 704: Determine the sub-pixel value to be the first sub-pixel value.

Step 706: Determine whether the first feature value is smaller than a second threshold? If yes, proceed to Step 708; otherwise, proceed to Step 712.

Step 708: Obtain a weight value from the weight table 140 according to the first feature value.

Step 710: Determine the sub-pixel value to be a weighted average of the first sub-pixel value and the second sub-pixel value according to the weight value.

Step 712: Determine the sub-pixel value to be the second sub-pixel value.

Step 714: End.

According to the process 70, the color adjustment module 108 compares the first feature value with the first threshold and a second threshold, and correspondingly adjusts the sub-pixel value of the pixel according to both the first sub-pixel value and the second sub-pixel value. In the embodiment, when the first feature value is smaller than the first threshold (i.e., when the saturation value or the luminance value of the pixel is so low that the color of the pixel cannot be effectively recognized by the naked eye), the sub-pixel value of the pixel may be determined to be the first sub-pixel value obtained from the general ACC lookup table (the first lookup table 130) (Step 704). When the first feature value is greater than or equal to the first threshold and smaller than the second threshold, the color adjustment module 108 may obtain the weight value from the weight table 140 according to the first feature value (Step 708) and determine the sub-pixel value to be a weighted average of the first sub-pixel value and the second sub-pixel value according to the weight value (Step 710). When the first feature value is greater than or equal to the second threshold, the sub-pixel value of the pixel may be determined to be the second sub-pixel value obtained from the clip ACC lookup table (the second lookup table 132). It should be noted, in the embodiment, the weight value determined by the weight table 140 is required to let the proportion of the second sub-pixel value be positively related to the first feature value after calculating the weighted average of the first sub-pixel value and the second sub-pixel value. In other words, as the first feature value gets closer to the first threshold, the determined sub-pixel value needs to be closer to the first sub-pixel value obtained from the first lookup table 130; as the first feature value gets closer to the second threshold, the determined sub-pixel value needs to be closer to the second sub-pixel value obtained from the second lookup table 132. That is to say, when the first feature value of the pixel is greater than or equal to the first threshold and smaller than the second threshold, the adjusted sub-pixel value will be in the range between the first sub-pixel value and the second sub-pixel value.

Figure 8:
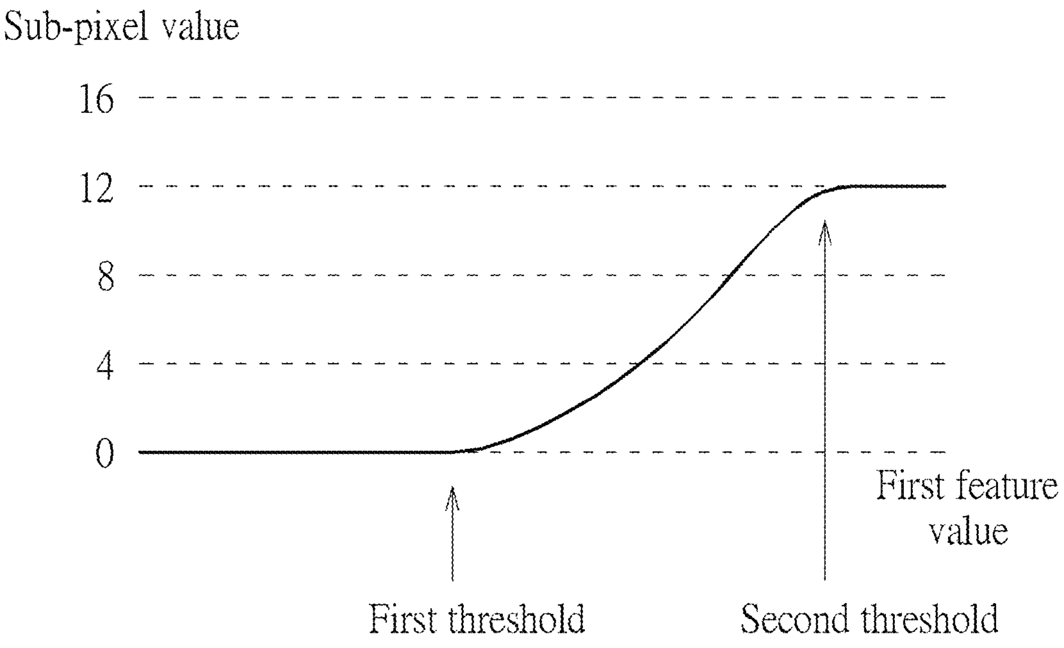
FIG. 8 is a schematic diagram of determining a sub-pixel value according to an exemplary embodiment of the present invention.

Please refer to FIG. 8, which is a schematic example of determining a sub-pixel value according to the process 70. Taking the sub-pixel value corresponding to the color index 000 in Table 1 and Table 2 as an example, the look-up table module 106 obtains the first sub-pixel value as (0, 0, 0) based on the first lookup table 130 (Table 1) and obtains the second sub-pixel value as (12, 12, 12) based on the second lookup table 132 (Table 2). As shown in FIG. 8, according to the process 70, when the first feature value is smaller than the first threshold, the color adjustment module 108 adjusts the sub-pixel value of the pixel to the first sub-pixel value (0, 0, 0). When the first feature value is greater than or equal to the first threshold and smaller than the second threshold, the color adjustment module 108 adjusts the sub-pixel value of the pixel to the weighted average of the first sub-pixel value and the second sub-pixel value according to the weight value. In other words, when the first feature value of the pixel is greater than or equal to the first threshold and smaller than the second threshold, the adjusted sub-pixel value will be in the range [0, 12]. When the first feature value is greater than or equal to the second threshold, the color adjustment module 108 adjusts the sub-pixel value of the pixel to the second sub-pixel value (12, 12, 12). As shown in FIG. 8, when the first feature value of the pixel is greater than or equal to the first threshold and smaller than the second threshold, the relationship between the first feature value and the sub-pixel value determined based on the first feature value preferably presents a smooth increasing curve, and is not limited thereto.

Figure 9:
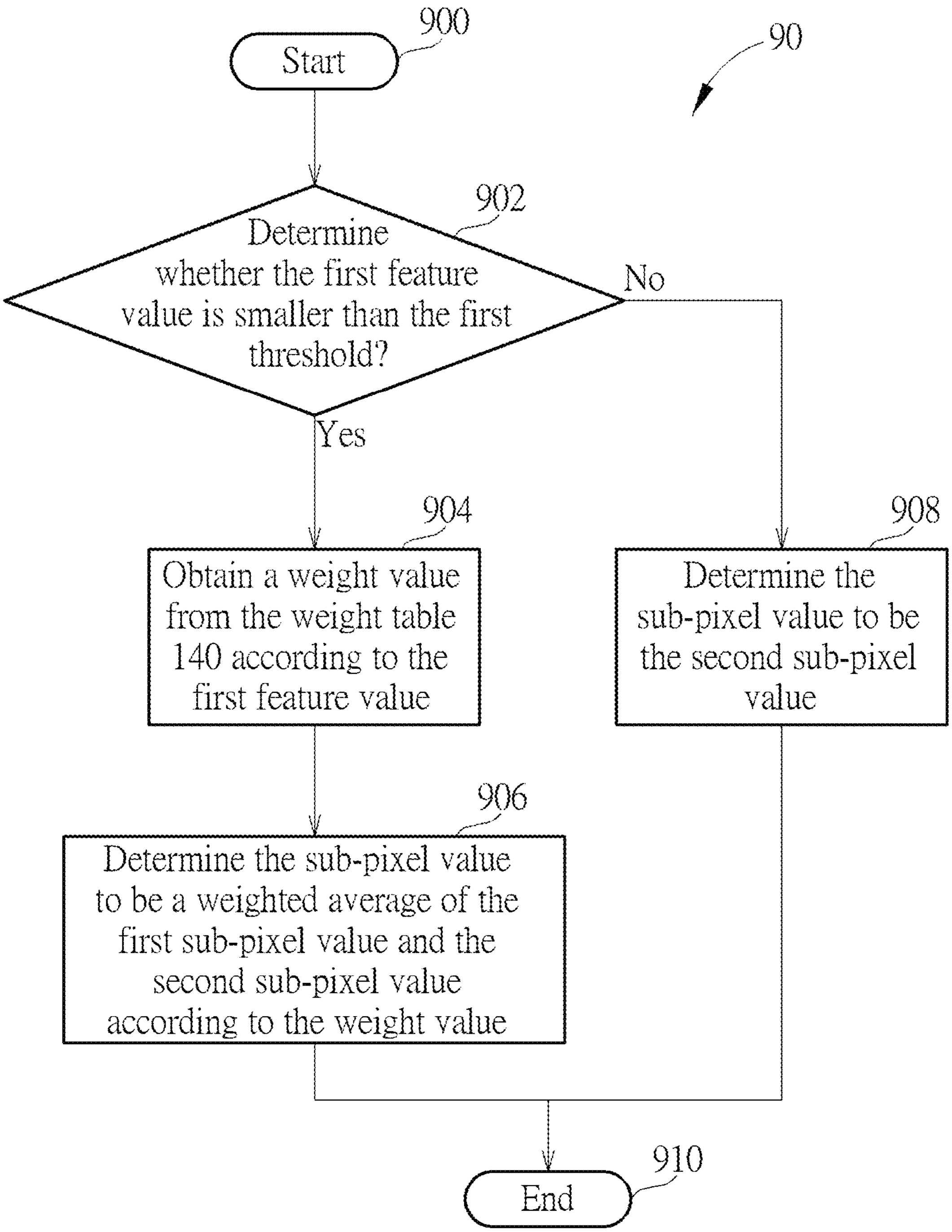
FIG. 9 is a schematic diagram of a process for determining a sub-pixel value according to an embodiment of the present invention.

Please refer to FIG. 9, which is a schematic diagram of another process 90 where the color adjustment module 108 adjusts the sub-pixel value in Step 408 according to the embodiment of the present invention. The process 90 may comprise the following steps:

Step 900: Start.

Step 902: Determine whether the first feature value is smaller than the first threshold? If yes, proceed to Step 904; otherwise, proceed to Step 908.

Step 904: Obtain a weight value from the weight table 140 according to the first feature value.

Step 906: Determine the sub-pixel value to be a weighted average of the first sub-pixel value and the second sub-pixel value according to the weight value.

Step 908: Determine the sub-pixel value to be the second sub-pixel value.

Step 910: End.

According to the process 90, the color adjustment module 108 compares the first feature value with the first threshold, and correspondingly adjusts the sub-pixel value of the pixel according to both the first sub-pixel value and the second sub-pixel value. In the embodiment, when the first feature value is greater than or equal to the first threshold (i.e., when the saturation value or the luminance value of the pixel is so high that the color of the pixel can be effectively recognized by the naked eye), the sub-pixel value may be determined to be the second sub-pixel value obtained according to the clip ACC lookup table (the second lookup table 132) (Step 908). When the first feature value is smaller than the first threshold, the color adjustment module 108 may obtain the weight value from the weight table 140 according to the first feature value (Step 904) and determine the sub-pixel value to be a weighted average of the first sub-pixel value and the second sub-pixel value according to the weight value (Step 906). It should be noted, in the embodiment, the weight value determined by the weight table 140 is required to let the proportion of the second sub-pixel value be positively related to the first feature value after calculating the weighted average of the first sub-pixel value and the second sub-pixel value. In other words, as the first feature value gets closer to the first threshold, the determined sub-pixel value needs to be closer to the second sub-pixel value obtained from the second lookup table 132; as the first feature value gets closer to 0, the determined sub-pixel value needs to be closer to the first sub-pixel value obtained from the first lookup table 130. That is to say, when the first feature value of the pixel is smaller than the first threshold, the adjusted sub-pixel value will be in the range between the first sub-pixel value and the second sub-pixel value.

Figure 10:
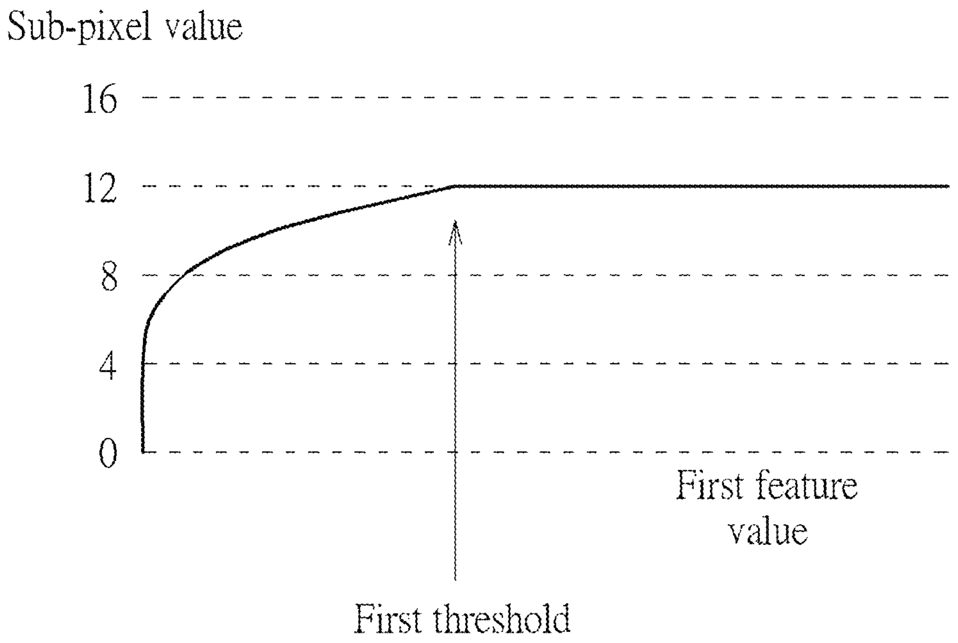
FIG. 10 is a schematic diagram of determining a sub-pixel value according to an exemplary embodiment of the present invention.

Please refer to FIG. 10, which is a schematic example of determining a sub-pixel value according to the process 90. Taking the sub-pixel value corresponding to the color index 000 in Table 1 and Table 2 as an example, the look-up table module 106 obtains the first sub-pixel value as (0, 0, 0) based on the first lookup table 130 (Table 1) and obtains the second sub-pixel value as (12, 12, 12) based on the second lookup table 132 (Table 2). As shown in FIG. 10, according to the process 90, when the first feature value is greater than or equal to the first threshold, the color adjustment module 108 adjusts the sub-pixel value of the pixel to the second sub-pixel value (12, 12, 12). When the first feature value is smaller than the first threshold, the color adjustment module 108 adjusts the sub-pixel value of the pixel uses the weighted average of the first sub-pixel value and the second sub-pixel value as the sub-pixel value according to the weight value. In other words, when the first feature value of the pixel is smaller than the first threshold, the adjusted sub-pixel value will be in the range [0, 12]. As shown in FIG. 10, when the first feature value of the pixel is smaller than the first threshold, the relationship between the first feature value and the sub-pixel value determined based on the first feature value preferably presents a smooth increasing curve, and is not limited thereto.

Furthermore, since the sensing capability of human eyes for color recognition varies in different colors with the same saturation or same luminance, the embodiments of the present invention further determine the first threshold and the second threshold based on a hue value of the pixel. In Step 202, the feature extraction module 104 may further obtain a second feature value of the pixel according to the sub-pixel value of the pixel, and determine the first threshold and the second threshold according to the second feature value. The second feature value may be a hue value of the pixel, and the first feature value may be the saturation value or the luminance value mentioned above. In other words, when the first feature value is the saturation value of the pixel, the color adjustment module 108 may set different saturation values as the first threshold and the second threshold according to colors in different color gamuts; when the first feature value is the luminance value of the pixel, the color adjustment module 108 may set different luminance values as the first threshold and the second threshold according to colors in different color gamuts.

In summary, the present invention provides a timing controller and an image adjustment method for improving the contour phenomenon while preserving low-level colors, which achieves the effect of maintaining full-area contrast of an image and reduce the loss of saturation, improving the quality of the image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image adjustment method, comprising:

obtaining a first feature value of a pixel according to a sub-pixel value of the pixel;

obtaining a first sub-pixel value of the pixel according to a first lookup table;

obtaining a second sub-pixel value of the pixel according to a second lookup table; and comparing the first feature value with a first threshold, and correspondingly adjusting the sub-pixel value of the pixel according to the first sub-pixel value and the second sub-pixel value;

wherein the image adjustment method further comprises:

obtaining a second feature value of the pixel according to the sub-pixel value of the pixel; and determining the first threshold according to the second feature value.

2. The image adjustment method of claim 1, wherein the first feature value is a saturation value or a luminance value of the pixel.

3. The image adjustment method of claim 1, wherein the second feature value is a hue value of the pixel.

4. The image adjustment method of claim 1, wherein the step of comparing the first feature value with the first threshold, and correspondingly adjusting the sub-pixel value of the pixel according to the first sub-pixel value and the second sub-pixel value comprises:

when the first feature value is smaller than the first threshold, the sub-pixel value is set to be the first sub-pixel value.

5. The image adjustment method of claim 1, wherein the step of comparing the first feature value with the first threshold, and correspondingly adjusting the sub-pixel value of the pixel according to the first sub-pixel value and the second sub-pixel value comprises:

when the first feature value being greater than or equal to the first threshold, the sub-pixel value is determined according to a weight value, the first sub-pixel value and the second sub-pixel value.

6. The image adjustment method of claim 5, wherein the step of determining the sub-pixel value according to the weight value, the first sub-pixel value and the second sub-pixel value comprises:

obtaining the weight value from a weight table according to the first feature value; and determining the sub-pixel value to be a weighted average of the first sub-pixel value and the second sub-pixel value.

7. The image adjustment method of claim 1, wherein the step of comparing the first feature value with the first threshold, and correspondingly adjusting the sub-pixel value of the pixel according to the first sub-pixel value and the second sub-pixel value comprises:

when the first feature value is greater than or equal to a second threshold, the sub-pixel value is set to be the second sub-pixel value;

wherein the second threshold is greater than the first threshold.

8. The image adjustment method of claim 7, further comprising:

determining the second threshold according to the second feature value.

9. The image adjustment method of claim 8, wherein the second feature value is a hue value of the pixel.

10. A timing controller, comprising:

an image adjustment circuit, comprising:

a feature extraction circuit, configured to obtain a first feature value of a pixel according to a sub-pixel value of the pixel;

a look-up table circuit, coupled to the feature extraction circuit, configured to obtain a first sub-pixel value of the pixel according to a first lookup table and obtain a second sub-pixel value of the pixel according to a second lookup table; and a color adjustment circuit, coupled to the feature extraction circuit and the look-up table circuit, configured to compare the first feature value with a first threshold, and correspondingly adjust the sub-pixel value of the pixel according to the first sub-pixel value and the second sub-pixel value;

wherein the feature extraction circuit is further configured to:

obtain a second feature value of the pixel according to the sub-pixel value of the pixel; and determine the first threshold according to the second feature value.

11. The timing controller of claim 10, wherein the first feature value is a saturation value or a luminance value of the pixel.

12. The timing controller of claim 10, wherein the second feature value is a hue value of the pixel.

13. The timing controller of claim 10, wherein the color adjustment circuit is further configured to:

when the first feature value is smaller than the first threshold, the sub-pixel value is set to be the first sub-pixel value.

14. The timing controller of claim 10, wherein the color adjustment circuit is further configured to:

when the first feature value is greater than or equal to the first threshold, the sub-pixel value is determined according to a weight value, the first sub-pixel value and the second sub-pixel value.

15. The timing controller of claim 14, wherein the color adjustment circuit is further configured to:

obtain the weight value from a weight table according to the first feature value; and determine the sub-pixel value to be a weighted average of the first sub-pixel value and the second sub-pixel value.

16. The timing controller of claim 10, wherein the color adjustment circuit is further configured to:

when the first feature value is greater than or equal to a second threshold, the sub-pixel value is set to be the second sub-pixel value;

wherein the second threshold is greater than the first threshold.

17. The timing controller of claim 16, wherein the feature extraction circuit is further configured to:

determine the second threshold according to the second feature value.

18. The timing controller of claim 17, wherein the second feature value is a hue value of the pixel.

* * * * *